(12) United States Patent
Fukuhara et al.

(10) Patent No.: US 7,677,427 B2
(45) Date of Patent: Mar. 16, 2010

(54) WELDING TOOL FOR FRICTION-STIR WELDING APPARATUS

(75) Inventors: Kazumi Fukuhara, Akashi (JP); Masayuki Inuzuka, Ikeda (JP); Mitsuo Fujimoto, Kobe (JP); Ryoji Ohashi, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 567 days.

(21) Appl. No.: 11/342,659

(22) Filed: Jan. 31, 2006

(65) Prior Publication Data

US 2006/0169740 A1 Aug. 3, 2006

(30) Foreign Application Priority Data

Feb. 2, 2005 (JP) ............................. 2005-026464

(51) Int. Cl.
*B23K 20/12* (2006.01)
(52) U.S. Cl. ..................... 228/2.1; 228/112.1
(58) Field of Classification Search .............. 228/112.1, 228/2.1
See application file for complete search history.

(56) References Cited

U.S. PATENT DOCUMENTS

| 5,971,247 A | * | 10/1999 | Gentry .................... 228/2.1 |
| 6,138,895 A | * | 10/2000 | Oelgoetz et al. .......... 228/112.1 |
| 6,354,175 B1 | * | 3/2002 | Dobson et al. ................ 81/119 |
| 2002/0014516 A1 | | 2/2002 | Nelson et al. |
| 2002/0125297 A1 | * | 9/2002 | Stol et al. ................ 228/112.1 |
| 2003/0141343 A1 | | 7/2003 | Murakami |
| 2003/0201307 A1 | * | 10/2003 | Waldron et al. .......... 228/112.1 |
| 2004/0155093 A1 | | 8/2004 | Nelson et al. |
| 2004/0195290 A1 | | 10/2004 | Nagao |

FOREIGN PATENT DOCUMENTS

| EP | 1 437 193 A1 | 7/2004 |
| JP | A 2003-260572 | 9/2003 |
| JP | A 2003-326372 | 11/2003 |
| JP | A 2003-532542 | 11/2003 |
| JP | A 2005-199281 | 7/2005 |
| WO | WO 01/85384 A1 | 11/2001 |

* cited by examiner

*Primary Examiner*—Jessica L. Ward
*Assistant Examiner*—Megha Mehta
(74) *Attorney, Agent, or Firm*—Oliff & Berridge, PLC

(57) ABSTRACT

The invention is a welding tool used in a friction-stir welding apparatus for welding a plurality of members to be welded. The welding tool includes: a tool holder having a front end and a base end, the base end being held by the friction-stir welding apparatus so as to be driven to rotate and move by the friction-stir welding apparatus; and a welding unit of a wear resistant material adapted to be removably mounted on the front end of the tool holder, the welding unit mounted on the front end of the tool holder being immersed into a part of the members to be welded during a friction-stir welding.

10 Claims, 12 Drawing Sheets

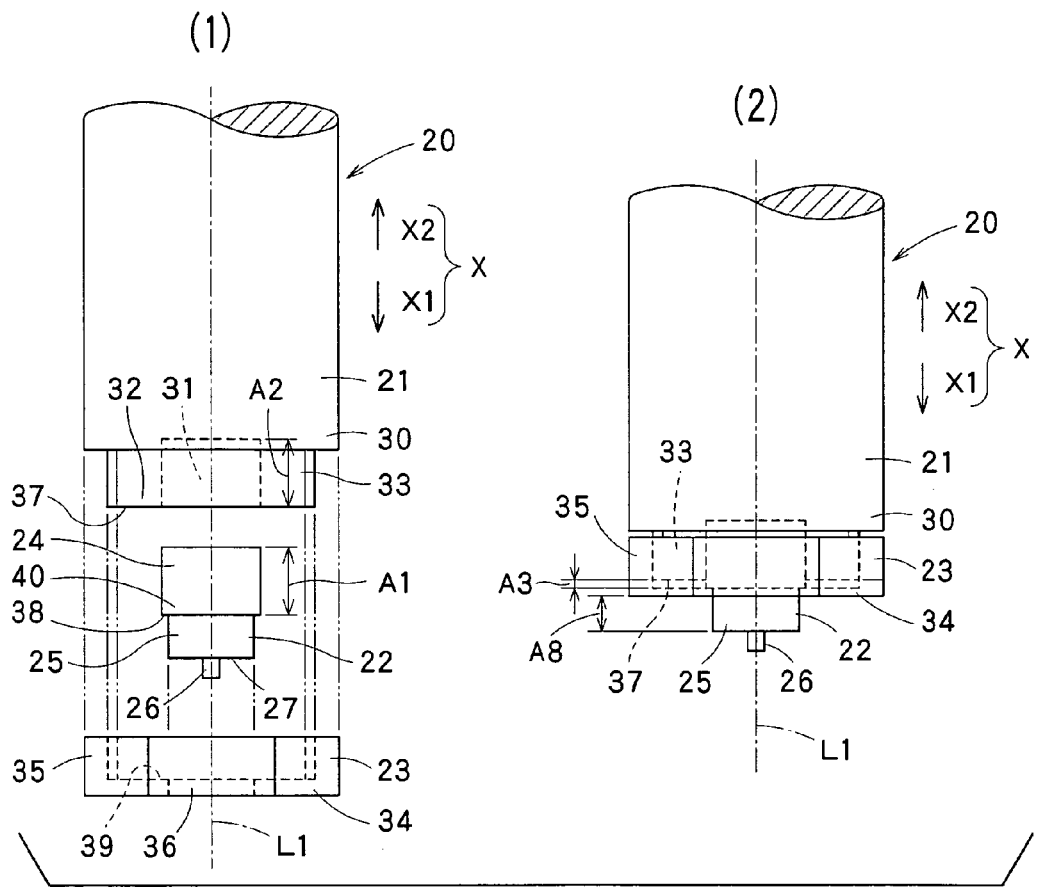
F I G. 2
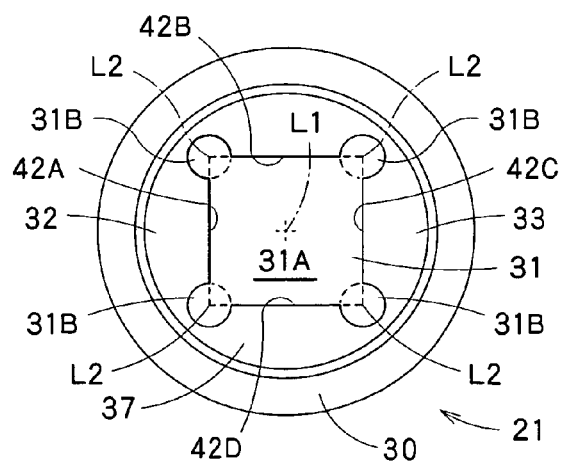
F I G. 3

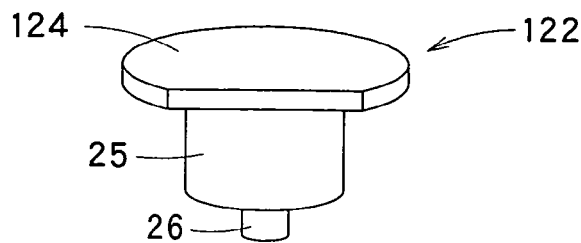
F I G. 1 5
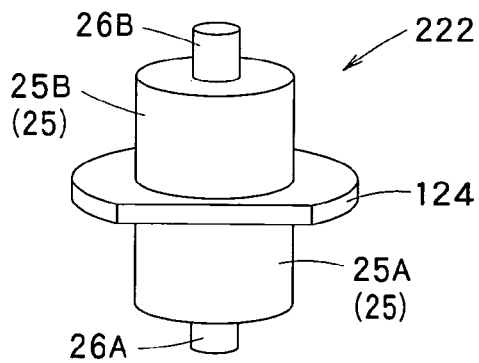
F I G. 1 6
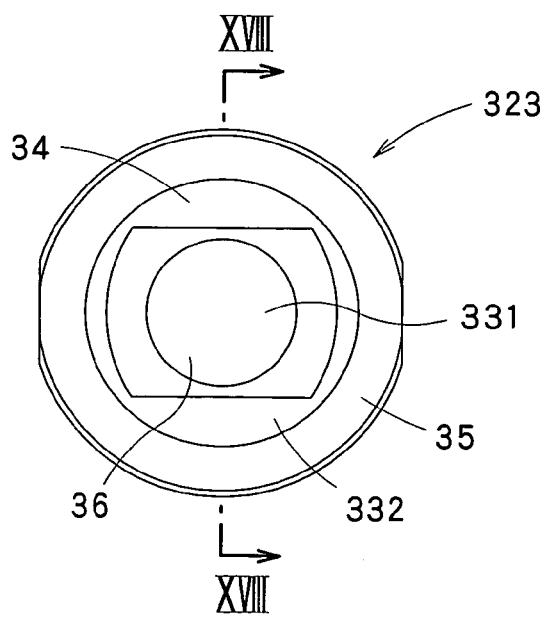
F I G. 1 7

WELDING TOOL FOR FRICTION-STIR WELDING APPARATUS

CROSS REFERENCE TO RELATED APPLICATIONS

This application is base upon the prior Japanese Patent Application No. 2005-26464 filed on Feb.2, 2005, the entire contents of which are incorporated herein by reference.

BACKGROUND OF THE INVENTION

1. Field of the Invention

The present invention relates to a welding tool for a friction-stir welding apparatus for friction-stir welding a plurality of members to be welded, and particularly to a welding tool for spot friction-stir welding hard members to be welded such as steel members.

2. Description of the Related Art

As an apparatus for welding a plurality of members to be welded, there is a friction-stir welding apparatus available. The apparatus arranges a welding tool at a part to be welded of an article composed of stacked members. Next, the apparatus presses the welding tool against the part to be welded while rotating the welding tool and immerses the front end of the welding tool into the part to be welded. The welding tool rotates while the front end thereof is pressed against the part to be welded. By doing this, frictional heat is produced, thereby the part to be welded is softened, and the boundary part of each member to be welded is stirred. Hereafter, each stirred boundary part is solidified and each member is welded.

When each member to be welded is made of an aluminum alloy, the front end of the welding tool is little worn away. Therefore, one welding tool can weld a plurality of parts to be welded in different locations. However, when a member to be welded is a hard member such as a steel member, the front end of the welding tool is worn away remarkably. Therefore, parts which can be welded by one welding tool decreases and the exchange frequency of the welding tool increases. As a conventional art for solving this problem, a welding tool having a front end made of a highly wear resistant material is disclosed, for example, in Japanese Patent Laid-Open Publication No. 2003-532542.

In the welding tool of the related art disclosed in the patent publication aforementioned, a shank which is a base end is formed separately from a pin section which is a front end and a shoulder section. Further, a ring collar member clamps both the outer peripheral surface of the shank and the outer peripheral surface of the shoulder section, so that the shank, the pin section, and the shoulder section are fixed mechanically. For example, the collar member clamps the shank and the shoulder section by a fixing method such as shrinkage fit or press fit.

In the related art, when the pin section or the shoulder section is worn away, it is difficult to exchange only the pin section and the shoulder section independently from the shank, and it is necessary to exchange the whole welding tool. Therefore, the expense caused by the exchange of the welding tool increases, thereby the welding cost inevitably increases.

SUMMARY OF THE INVENTION

Therefore, an object of the present invention is to provide a welding tool capable of reducing the cost spent for friction-stir welding.

The present invention is a welding tool used in a friction-stir welding apparatus for welding a plurality of members to be welded, including: a tool holder having a front end and a base end, the base end being held by the friction-stir welding apparatus so as to be driven to rotate and move by the friction-stir welding apparatus; and a welding unit of a wear resistant material adapted to be removably mounted on the front end of the tool holder, the welding unit mounted on the front end of the tool holder being immersed into a part of the members to be welded during a friction-stir welding.

According to the present invention, the tool holder is held by the friction-stir welding apparatus while the welding unit is mounted on the tool holder. Next, while the welding tool rotates about the axis by the friction-stir welding apparatus, the welding unit makes contact with a part of an article to be welded. When the welding unit slides in contact with the part to be welded, frictional heat is produced in the part to be welded and the part is softened. In this way, the boundary part of each member to be welded is fluidized in the non-melt state, and the fluidized part is stirred, so that each member to be welded can be welded.

The welding unit is immersed into the part to be welded, so that it is worn away more easily than the tool holder. However, in the present invention, the welding unit is configured to be removable. Therefore, when the welding unit is worn away, the worn welding unit is removed, and a new welding unit is attached to the tool holder. Thus the welding work can be continued without exchanging the tool holder. The welding unit of the welding tool which is easily worn out can be exchanged like this, so that there is no need to exchange the whole welding tool whenever the welding unit is worn out, and the tool holder can be reused. Therefore, the cost spent for friction-stir welding can be decreased.

Further, the welding unit is realized by a wear resistant material, so that even when welding hard members such as steel members, the number of times of welding until the welding unit is worn away can be increased. In other words, the number of times of exchange of the welding unit can be reduced and the time required for exchange of the welding unit can be shortened. Further, only the welding unit is realized by a wear resistant material, thus compared with a case that the whole welding tool is realized by a wear resistant material, the welding tool can be realized at lower cost.

Preferably, the welding unit includes: a mounting section adapted to be mounted on the tool holder; a shoulder section connected to the mounting section and having an end face, the shoulder section being formed in a columnar shape coaxial with a rotation axis of the tool holder when the mounting section is mounted on the tool holder; and a pin section projected in an axial direction along the rotation axis from the end face of the shoulder section, the pin section being formed coaxially with the rotation axis of the tool holder when the mounting section is mounted on the tool holder, the pin section being formed in a columnar shape or a conical shape with a diameter smaller than a diameter of the shoulder section.

According to the present invention, at time of friction-stir welding, firstly, the pin section is immersed into the part to be welded and then the end face of the shoulder section slides on the surface of the part to be welded. Since the pin section is immersed into the part to be welded, the flow area of the part to be welded can be made larger. Further, the shoulder section slides on the surface of the part to be welded so that the fluid substance fluidized among the part to be welded rotates greatly about the axis, thus the stirring efficiency can be improved. The pin section and the shoulder section are formed on the welding unit like this, so that each member to be welded can extend the mixed area to a wide range and the welding strength can be improved.

Preferably, the welding tool further includes a fixing member adapted to be mounted on the tool holder for removably fixing the welding unit to the tool holder.

According to the present invention, the welding unit is fixed to the tool holder by the fixing member, so that there is no need to structure the welding unit itself so as to be fixed to the tool holder and the shape of the welding unit can be simplified. Since the welding unit is simplified like this, it can be formed at low cost and can be formed easily by a wear resistant material.

Preferably, the tool holder has a fitting concavity at the front end of the tool holder, the mounting section being loosely fitted into the fitting concavity of the tool holder, the mounting section is formed so as to project beyond the shoulder section in a radial direction, the mounting section being prevented from an angular displacement about the rotation axis of the tool holder with respect to the tool holder when the mounting section is fitted into the fitting concavity of the tool holder, and the fixing member is adapted to be mounted on the tool holder so as to clamp the mounting section in the axial direction in cooperation with the tool holder so that the welding unit is prevented from coming out from the fitting concavity in the axial direction.

According to the present invention, since the mounting section is loosely fitted into the fitting concavity, the welding unit is prevented from angular displacement about the axis with respect to the tool holder. Further, since the mounting section is clamped by the tool holder and the fixing member in the axial direction, the welding unit is prevented from coming out of the fitting concavity.

The mounting section is loosely fitted into the fitting concavity, so that there is no need to form the welding unit and the fitting concavity with high precision and the dimensional accuracy required for the welding unit and the tool holder can be lowered. Therefore, the yield rate of the welding tool is increased and the manufacturing cost can be decreased more. Further, a gap is formed between the mounting section and the fitting section where the fitting concavity is formed, so that the welding tool can be mounted or demounted easily from the tool holder. Further, the mounting section is clamped in the axial direction, so that the welding unit is prevented from slipping on the tool holder in the axial direction. Therefore, at time of welding, even if reactive force in the axial direction and about the rotation axis is given to the welding unit from an article to be welded, the welding unit can be prevented from being shifted from the tool holder.

Further, the mounting section is clamped and fixed in the axial direction, so that the dimension of the welding unit in the axial direction is made smaller, thus the displacement of the welding unit in the axial direction can be prevented surely, and the welding unit can be miniaturized.

Preferably, the mounting section has a section perpendicular to the rotation axis, the section including corners, at least either the fitting concavity or the mounting section is configured so that only a remaining part excluding the corners of the mounting section makes contact with the tool holder when the mounting section is fitted into the fitting concavity.

For example, according to the present invention, in the tool holder, a relief hole for preventing it from making contact with the corners may be formed. Further, for example, according to the present invention, cutting off a part of the corners of the mounting section, R chamfering or C chamfering may be executed.

According to the present invention, when the welding unit is immersed into the part to be welded, reactive force is applied to the welding unit from the part to be welded. The reactive force is transferred from the welding unit to the tool holder. The welding unit and the tool holder are in contact with each other in the part excluding the corners, so that the reactive force is not concentrated at one point and is dispersed and transferred to the tool holder. By doing this, the tool holder is prevented from application of local large force and the tool holder and the welding unit can be prevented from damage.

Preferably, the welding unit is made of a material composed of a main component of silicon nitride.

According to the present invention, the welding unit is composed of a main component of silicon nitride, so that the welding tool obtains high strength and wear resistance and can obtain resistance to thermal shock. When repeating friction-stir welding, the welding unit repeats a condition that it becomes hot at time of welding and when it moves to the next welded part, becomes cool, thus the temperature change of the welding unit is large. As mentioned above, the welding unit of the present invention has a resistance to thermal shock, so that it can withstand sudden temperature change. Therefore, and even if welding of a plurality of parts to be welded is repeated, the welding unit can sufficiently maintain strength necessary as a welding unit.

Preferably, the welding tool is used for a spot welding to the members to be welded.

According to the present invention, the welding tool is pressed against the part to be welded while rotating about the rotation axis and is immersed into and left from the welded part in the axial direction. The welding tool for a spot welding does not need to move perpendicularly to the axis, so that there is no need to fix strongly the welding unit and the tool holder perpendicularly to the rotation axis and a constitution of removably attaching the welding unit to the tool holder can be simply realized.

The present invention is a welding unit used for the welding tool mentioned above, wherein the welding unit is made of a wear resistant material and adapted to be removably mounted on the front end of the tool holder, the welding unit mounted on the front end of the tool holder being immersed into a part of the members to be welded during a friction-stir welding.

According to the present invention, the welding unit is configured to be removable from the tool holder, so that even if the welding unit is damaged, a new welding unit is attached to the tool holder, thus the welding work can be continued. Therefore, the welding work can be continued without exchanging the tool holder. The welding unit of the welding tool which is easily worn out can be exchanged like this, so that there is no need to exchange the whole welding tool whenever the welding unit is worn out, and the tool holder can be reused, and the cost spent for welding can be decreased.

The present invention is a friction-stir welding apparatus for welding a plurality of members to be welded, including: the welding tool mentioned above; a tool holding section adapted to hold the welding tool; rotation driving means for driving the tool holding section to rotate about the rotation axis; straight movement driving means for driving the tool holding section to move along the rotation axis.

BRIEF DESCRIPTION OF THE DRAWINGS

The above and other objects, features and advantages of the present invention will become more apparent from the following description taken in connection with the accompanying drawings, in which:

FIG. 2 includes an exploded front view and an assembled front view showing the welding tool 20;

FIG. 3 is an end face diagram showing a front end 30 of a tool holder 21;

FIG. 15 is a perspective view showing a welding unit 122 of the welding tool of the second embodiment of the present invention;

FIG. 16 is a perspective view showing a welding unit 222 of the welding tool of the third embodiment of the present invention;

FIG. 17 is an end face diagram showing a fixing member 323 of the welding tool of the fourth embodiment of the present invention;

DESCRIPTION OF THE PREFERRED EMBODIMENTS

Figure 1:
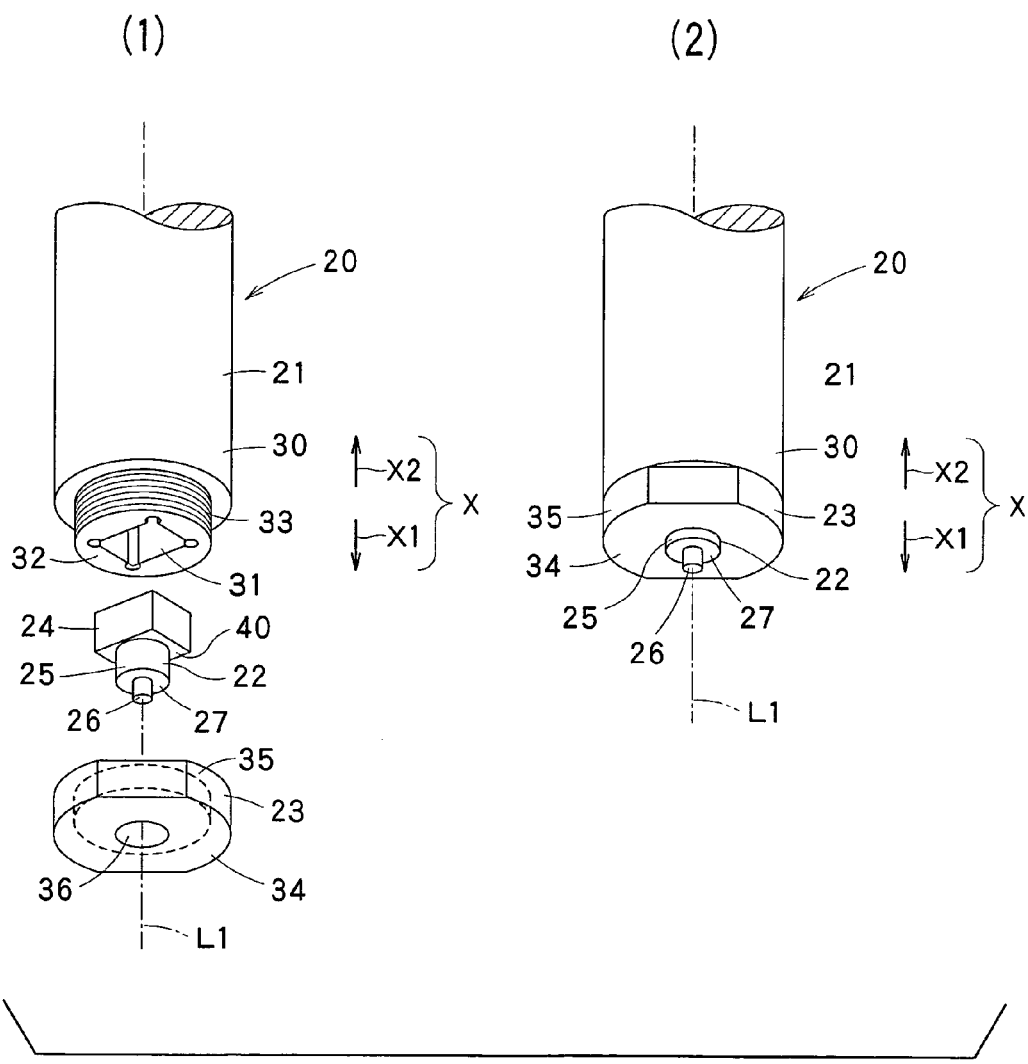
FIG. 1 includes an exploded perspective view and an assembled perspective view showing a welding tool 20 of the first embodiment of the present invention.

In the first embodiment of the present invention shown in FIG. 1, the welding tool 20 is a device for executing friction-stir welding and is held by a friction-stir welding apparatus. The friction-stir welding apparatus executes friction-stir welding (abbreviated to "FSW") for a plurality of members to be welded composing an article to be welded. In this embodiment, two members to be welded are supposed to be made of a material hard to be welded, such as a steel material and a plurality of dotted parts on the article are sequentially welded by the friction-stir welding apparatus. Namely, the friction-stir welding apparatus executes spot-welding by friction-stir welding. For example, using the friction-stir welding apparatus, outer plates of a car body or railroad car body are spot-welded.

The friction-stir welding apparatus (hereinafter, referred to as just "welding apparatus") executes friction-stir welding using the almost columnar welding tool 20. The welding tool 20 is structured so as to include a tool holder 21 which is formed in an almost columnar shape, a welding unit 22 mounted at a front end 30 of the tool holder 21, and a fixing member 23 for fixing the welding unit 22 to the tool holder 21. When the welding unit 22 is mounted on the tool holder 21 and the welding unit 22 is fixed to the tool holder 21 by the fixing member 23, welding is executed.

When using a hard article as a member to be welded, the tool holder 21 and welding apparatus are fixed strongly. Further, at the front end 30 of the tool holder 21, the welding unit 22 and the fixing member 23 are mounted and fixed. In this state, the welding apparatus, to weld the two stacked members to be welded, presses the welding unit 22 to the part to be welded while rotating the welding tool 20 about the axis L1 thereof. The welding unit 22 is pressed against the part to be welded while rotating. By doing this, the part to be welded generates frictional heat and is softened. Hereafter, the part is fluidized and the fluidized part is stirred in correspondence with rotation of the welding unit 22.

A welding unit 22 is immersed into the part to be welded, thus the front end passes through the boundary part of each member to be welded. And, the respective fluidized members to be welded are mixed mutually. When the two members to be welded are stirred sufficiently, the welding tool 20 is separated from the members to be welded and the fluidized welded part is fixed. By doing this, the boundary between the two members to be welded is eliminated and the two members can be spot-welded. The welding apparatus sequentially executes continuous spot welding of each part to be welded.

The tool holder 21 is formed in a columnar shape and the axis L1 of the tool holder 21 coincides with the axis L1 of the welding tool 20. At the base end of the tool holder 21, a holding section held removably by the welding apparatus is formed. At the front end 30 of the tool holder 21, a fitting section 32 and an external screw section 33 are formed. In the fitting section 32, a fitting concavity 31 into which the welding unit 22 is fitted partially is formed. Further, the external screw section 33 is formed in a columnar shape and on the outer periphery, an external screw with which the fixing member 23 is engaged is formed. In this case, the external screw formed on the external screw section 33 is formed in the same direction as the rotational direction of the tool holder 21. Therefore, when the tool holder 21 rotates clockwise by a welding apparatus 51, on the external screw section 33, a right-handed screw is formed. Further, when the tool holder 21 rotates counterclockwise, on the external screw section 33, a left-handed screw is formed. Therefore, during welding, when the fixing member 23 receives reactive force from the article to be welded, the tool holder 21 receives force in the joining direction, and the fixing member 23 can be prevented from being loosened during welding.

The fitting concavity 31 is immersed from the end face of the external screw section 33 and is formed coaxially with the axis L1 of the tool holder 21. The fitting concavity 31 is formed so that the sectional shape cut at the section perpendicular to the axis L1 is other than a circle. Namely, it is formed so that the distance from the axis of the tool holder 21 up to the wall face for specifying the fitting concavity 31 is changed round the axis L1. In this embodiment, the fitting concavity 31 is formed in an almost rectangular parallelepiped space and the sectional shape perpendicular to the axis L1 is a square. Hereinafter, the shape cut at the section perpendicular to the axis L1 is referred to as just a sectional shape.

The welding unit 22 is configured to be removably mounted at the front end of the tool holder 2, and a mounting section 24, a shoulder section 25, and a pin section 26 are formed. The shoulder section 25 is connected to the mounting section 24 and the pin section 26 is connected to the shoulder section 25. The shoulder section 25 and the pin section 26 are formed in a coaxial columnar or conical shape and the diameter of the pin section 26 is smaller than that of the shoulder section 25.

The mounting section 24 is a part where the welding unit 22 is mounted on the tool holder 21. Concretely, the mounting section 24 is formed so as to be loosely fitted into the fitting concavity 31 of the tool holder 21. In other words, the fitting concavity 31 and the mounting section 24 are formed so as to be gap fit. In this embodiment, as described above, the fitting concavity 31 is formed in an almost rectangular parallelepiped space, so that the mounting section 24 is also formed in an almost rectangular parallelepiped shape and the section is formed in a square shape.

The mounting section 24 is formed coaxially with the shoulder section 25 and has a projection section projected beyond the shoulder section 25 perpendicularly to the axis L1. In this embodiment, the mounting section 24 is formed so that the section is formed in a square shape having a side length equal to the diameter of the shoulder section 25. Therefore, corners 40 of the mounting section 24 are projected parts projected in the radial direction of the shoulder 25.

The diameter and dimension in the axial direction of the shoulder section 25 and the pin section 26 are predetermined according to the members to be welded and formed, welding condition, welding strength, and shape of welded mark. For example, the diameter of the shoulder section 25 is set to 10 mm and the diameter of the pin section 26 is set to 4 mm.

When the mounting section 24 is loosely fitted into the fitting concavity 31, the shoulder section 25 and the pin section 26 are arranged almost coaxially with the axis L1 of the tool holder 21. Further, the shoulder section 25 is partially projected from the tool holder 21 in one axial direction X1. Further, the pin section 26 is projected on one side in the axial direction from the end face in one axial direction X1 of the shoulder section 25. Here, one axial direction X1 is the direction from the base end of the tool holder 21 toward the front end 30 and the other axial direction X2 is the direction from the front end 30 of the tool holder 21 toward the base end.

The fixing member 23 is mounted removably at the front end 30 of the tool holder 21. The fixing member 23 is formed in a bottomed cylindrical shape having one open end and has an end wall section 34 and a peripheral wall section 35. The end wall section 34 is formed in a circular shape and a through hole 36 passing through the central axis is formed. The through hole 36 is formed coaxially with the end wall section 34 and formed slightly larger than the diameter of the shoulder section 25. The peripheral wall section 35 is formed in a cylindrical shape, is connected to the periphery of the end wall section 34, and is vertically installed in the axial direction overall the periphery of the end wall section 34. The peripheral wall section 35 has an internal screw formed on the inner periphery and is formed so as to be helically fitted to the external screw section 33 of the tool holder 21. The peripheral wall section 35 is helically fitted to the external screw section 33 of the tool holder 21, thus the fixing member 23 is fixed to the tool holder 23. The fixing member 23 fixed to the tool holder 21 is formed coaxially with the axis L1 of the tool holder 21. Further, a part of the outer periphery of the peripheral wall section 35 of the fixing member 23 is notched so that the fixing member 23 engaged with the tool holder 21 can be fixed and unfixed by a spanner.

FIG. 2 is a front view showing the welding tool 20. FIG. 2(1) shows the condition of each broken down constituent member of the welding tool 20. FIG. 2(2) shows the condition of each assembled constituent member of the welding tool 20. The mounting section 24 is fitted into the fitting concavity 31, thus the welding unit 22 is mounted on the tool holder 21. The mounting section 24 and the fitting concavity 31 are formed in a rectangular parallelepiped shape, so that when the mounting section 24 is fitted into the fitting concavity 31, the welding unit 22 is prevented from angular displacement about the axis L1 of the tool holder 21.

Further, a dimension A1 of the mounting section 24 in the axial direction is formed so as to be larger than a depth A2 of the fitting concavity 31. Therefore, when the mounting section 24 is fitted into the fitting concavity 31 and is in contact with the bottom of the fitting section 32, an end face 38 of the mounting section 24 on one side in the axial direction is projected from an end face 37 of the tool holder 21 on one side in the axial direction by a predetermined length A3.

The fixing member 23 is helically fitted to the tool holder 21, so that the fixing member 23 is mounted on the tool holder 21. The fixing member 23, when it is helically fitted to the tool holder 21, can helically move forward and backward in the axial direction X with respect to the tool holder 21. When the fixing member 23 helically moves forward on the other axial direction X2, the pin section 26 and the shoulder section 27 pass through the through hole 36 of the end wall section 34. And, an end face 39 of the end wall section 34 on the other side of the axial direction makes contact with the end face 38 of the mounting section 24 on in one axial direction X1. Furthermore, the fixing member 23 helically moves forward, thus the mounting section 24 is clamped by the fixing member 23 and the tool holder 21 in the axial direction X and is prevented from displacement with respect to the tool holder 21 in the axial direction X. The welding unit 22 is fixed to the tool holder 21 in this way.

When the welding unit 22 is fixed to the tool holder 21, the shoulder section 25 and the pin section 26 are projected from the welding unit 22 in one axial direction X1. Further, the shoulder 25 is projected from the end wall section 34 in the axial direction by a predetermined projection dimension A8. The projection dimension A8 is set to a dimension at which the fixing member 23 does not make contact with the welded article, even when the pin section 26 is immersed into the article to be welded by a predetermined immersion amount. By doing this, the fixing member 23 is prevented from making contact with the article to be welded and the fixing member 23 can be prevented from wear. The projection dimension A8 is preferably set to a dimension at which the member to be welded does not make contact with the fixing member 23, even if the member to be welded is warped toward the welding tool 20 at time of friction-stir welding. For example, in this embodiment, the projection dimension A8 is set to 3 mm.

Further, when the fixing member 23 helically fitted to the tool holder 21 helically moves backward in one axial direction X1, the joined condition of the tool holder 21 and the fixing member 23 can be released. By doing this, the fixing member 23 can be separated from the tool holder 21. Further, when the fixing member 23 is separated from the tool holder 21, the displacement of the welding unit 22 in the axial direction X for the tool holder 21 is allowed. In this state, when the welding unit 22 is moved in one axial direction X1, the fitting of the mounting section 24 and the fitting concavity 31 is released, thereby the welding unit 22 can be separated from the tool holder 21. Therefore, when the welding unit 22 is worn out, it can be exchanged with a new welding unit 22.

FIG. 3 is an end face diagram showing the front end 30 of the tool holder 21. The fitting section 32 is formed so that the portions thereof corresponding to the corners 40 of the mounting section 24 are apart from the corners 40 in the radially outward direction when the mounting section 24 is fitted into the fitting concavity 31. In other words, when the mounting section 24 is fitted in the fitting concavity 31, gaps are formed between the corners 40 of the mounting section 24 and the fitting section 32. In this embodiment, in the fitting section 32, a rectangular parallelepiped space 31A centering on the axis L1 is formed and columnar spaces 31B centering on a virtual point L2 where two planes among four peripheral walls 42A, 42B, 42C, and 42D extending in parallel with the axis L1 are crossed is formed. The columnar spaces 31B are respectively formed at the four corners of the rectangular parallelepiped space 31A. The fitting concavity 31 is formed so as to include the rectangular parallelepiped space 31A and the four columnar spaces 31B.

When the mounting section 24 is fitted into the fitting concavity 31, the mounting section 24 excluding the corners 40 thereof makes contact with the peripheral walls 42A, 42B, 42C, and 42D of the fitting section 32. The corners 40 of the mounting section 24 are stored in the columnar space 31B, thereby the corners 40 are prevented from making contact with the fitting section 32. The columnar space 31B is a relief hole for preventing the corners 40 of the welding unit 22 from damage due to reactive force during welding. By doing this, the fitting section 32 and the mounting section 24 are prevented from wear.

Figure 4:
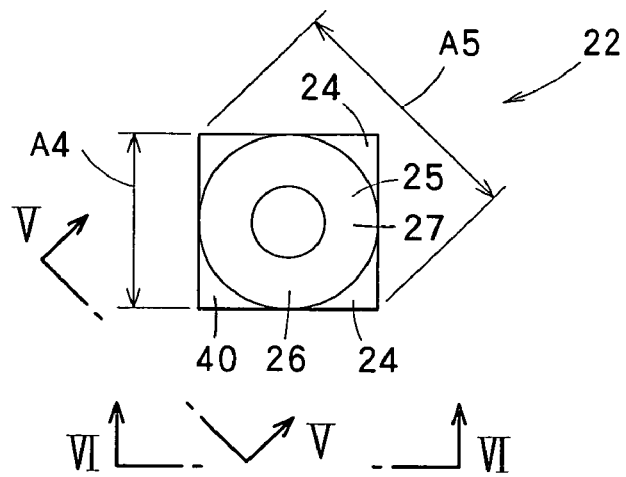
FIG. 4 is an end face diagram showing a welding unit 22.
Figure 5:
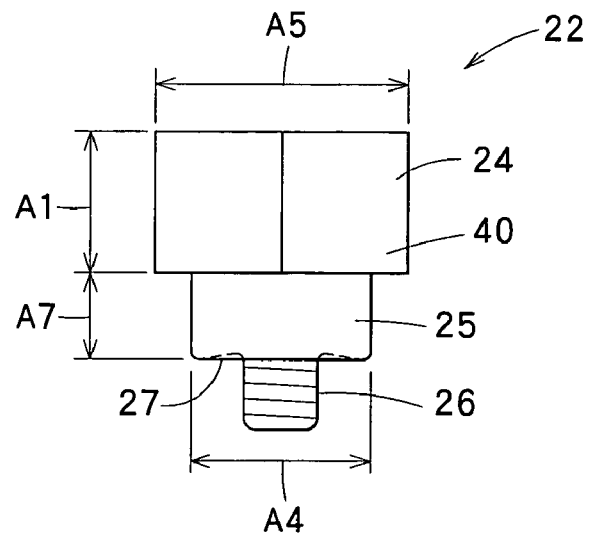
FIG. 5 is a drawing viewed in the direction of V-V shown in FIG. 4.
Figure 6:
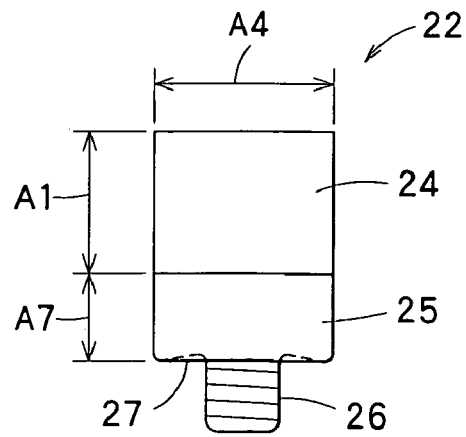
FIG. 6 is a drawing viewed in the direction of VI-VI shown in FIG. 4.

Referring to FIGS. 4 to 6, when the welding unit 22 cuts at the section perpendicular to the axis L1, the diameter A4 of the shoulder section 25 and the length of one side A4 of the mounting section 24 are formed so as to be equal to each other. Therefore, as shown in FIG. 5, as viewed in the direction perpendicular to the plane connecting the axis L1 and one corner 40, the corner 40 is projected in the perpendicular direction to the axis L1 beyond the shoulder section 25.

The pin section 26 has an external screw formed on the outer periphery and promotes stirring of the softened fluidized part. Further, when repeating spot welding, the welding unit 22 collides with an article to be welded every spot welding, so that the shock in the axial direction is large. In this embodiment, the welding unit 22 is chamfered as a whole, thus the welding unit 22 is prevented from being broken when colliding with an article to be welded. Concretely, the corner formed by the end face of the pin section 26 and the outer peripheral surface of the pin section 26 is chamfered. Further, the corner formed by the outer peripheral surface of the pin section 26 and the end face of the shoulder section 25 is chamfered. Further, the corner formed by the end face of the shoulder section 25 and the outer peripheral surface of the shoulder section 25 is chamfered. Further, the end face of the shoulder section 25 is formed in an almost conical shape and as approaching the axis L1 from the outer peripheral surface, is immersed in the axial direction X.

The welding unit 22 is realized by a wear resistant material. In this embodiment, the welding unit 22 is made of a material having a main component of silicon nitride ($Si_3N_4$) and the mounting section 24, the shoulder section 25, and the pin section 26 are formed integrally by sintering. Further, the tool holder 21 and the fixing member 23 are formed, for example, by device steel such as SKD-61.

In this embodiment, the welding unit 22 has the mechanical characteristics indicated below. The Vickers hardness specified in JIS (Japanese Industrial Standard) R1610 is 16 GPa, and the bending strength at 1200° C. specified in JIS R 1601 is 550 MPa, and the fracture toughness specified in JIS R 1607 is 6 MPa√m, and the resistance to thermal shock by the water-quenching method specified in JIS R 1648 is 650 K. Further, the coefficient of linear expansion at 25 to 100° C. specified in JIS R 1618 is 3.7.

When the welding unit 22 is formed from a material having a main component of polycrystalline cubic boron nitride (PCBN), the thermal conductivity is high, so that the temperature rise rate of the welding unit 22 during welding is low. Therefore, the welding time is apt to be prolonged. Further, it is necessary to install a heat flow barrier between the welding unit 22 and the tool holder 21 and prevent heat dispersion. Further, the coefficient of friction is low, so that time is taken to generate heat. On the other hand, when the welding unit 22 is realized by silicon nitride, there are few possibilities of causing the aforementioned problem.

Therefore, although it is possible to realize the welding unit 22 by PCBN, the welding unit 22 realized by silicon nitride can be used preferably as the welding unit 22. Further, when the surface of the welding unit 22 is formed with an aluminum oxide ($Al_2O_3$) layer, the resistance to oxidation and resistance to reaction can be improved and it can be more preferably as the welding unit 22.

Figure 7:
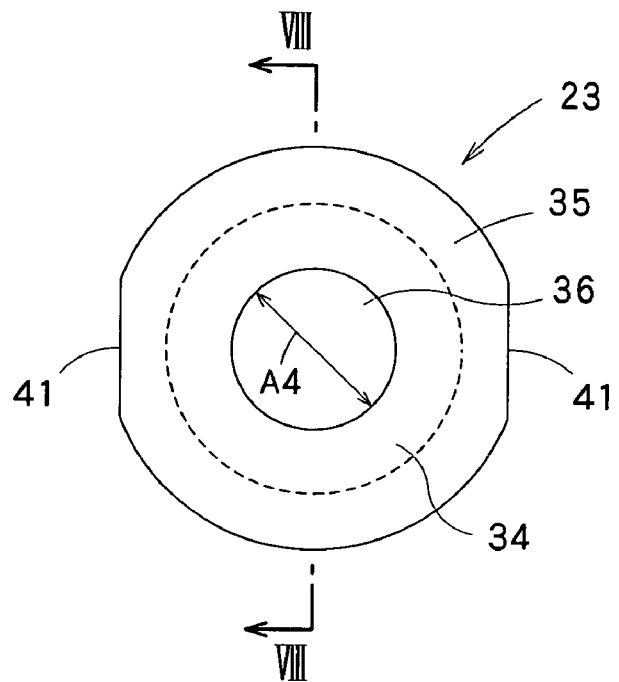
FIG. 7 is an end face diagram showing a fixing member 23.
Figure 8:
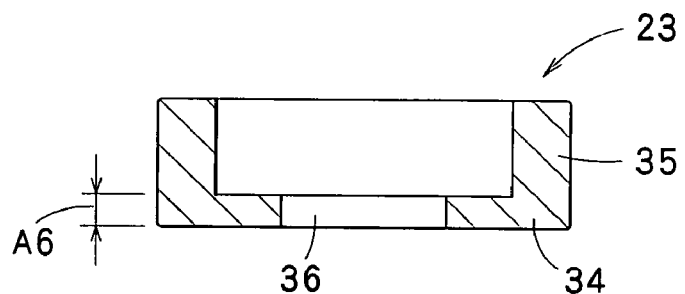
FIG. 8 is a sectional view when cut on the sectional line of VIII-VIII shown in FIG. 7.

Referring to FIGS. 7 and 8, the through hole 36 of the fixing member 23 has an inner diameter A4 slightly larger than the diameter of the shoulder section 25. Further, the thickness A6 of the end face 34 is smaller than the dimension A7 of the shoulder section 25 in the axial direction. Further, on the outer periphery of the fixing member 23, planes 41 parallel with each other are formed on both sides with respect to the central axis so as to fit a spanner between them.

Figure 9:
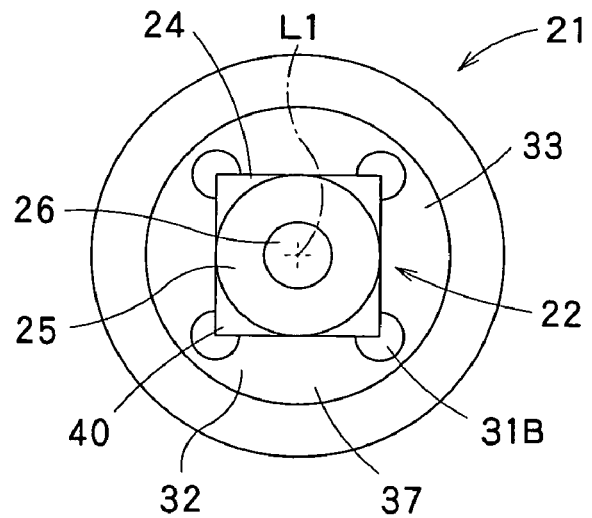
FIG. 9 is a drawing showing the state that the welding unit 22 is mounted on the tool holder 21.
Figure 10:
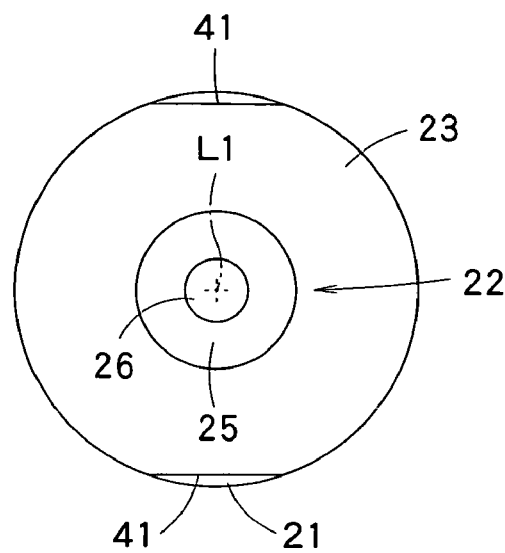
FIG. 10 is a drawing showing the state that the welding unit 22 and the fixing member 23 are fixed to the tool holder 21.

FIG. 9 is a drawing showing the state that the welding unit 22 is mounted on the tool holder 21. FIG. 10 is a drawing showing the state that the welding unit 22 and the fixing member 23 are fixed to the tool holder 21. As shown in FIG. 9, in the state that the welding unit 22 is mounted on the tool holder 21, the four corners 40 of the mounting section 24 are arranged away from the fitting section 32. Further, as shown in FIG. 10, in the state that the welding unit 22 is clamped by the tool holder 21 and fixing member 23, the shoulder section 25 is projected from the end wall section 34 of the fixing member 23 in the axial direction X.

Figure 11:
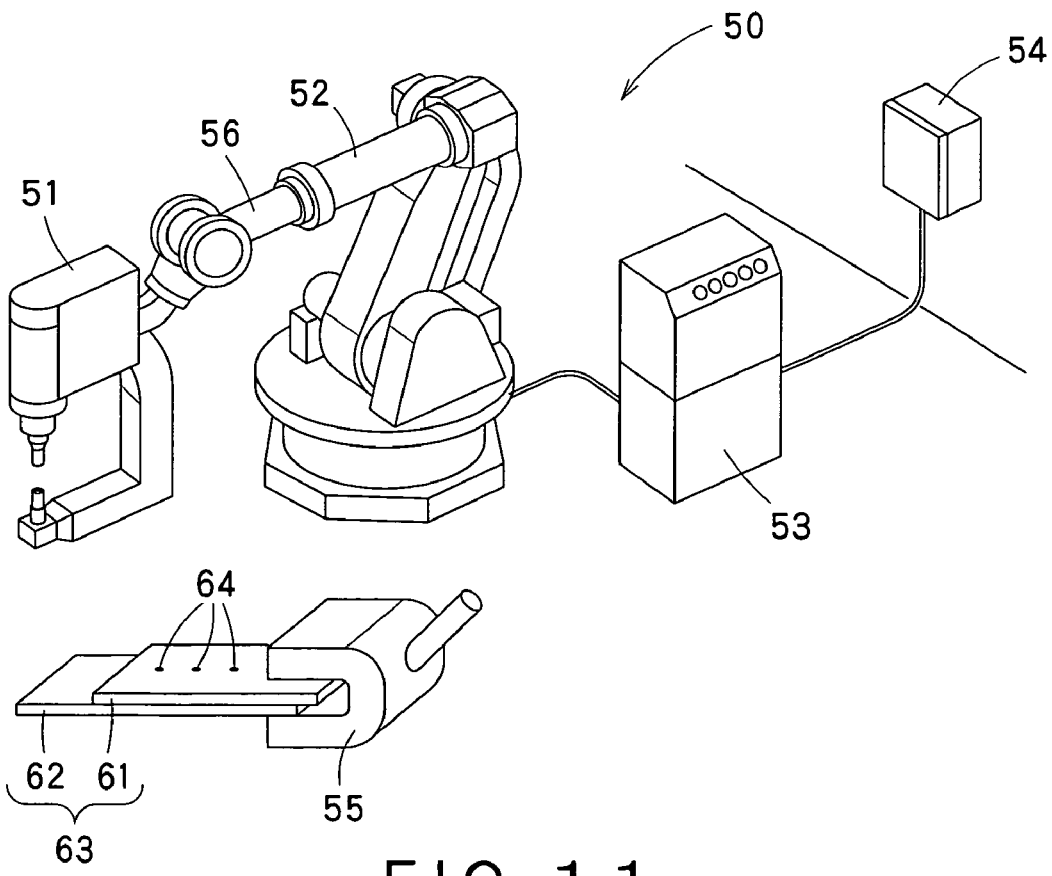
FIG. 11 is a perspective view showing a welding equipment 50 including a welding apparatus 51.

FIG. 11 is a perspective view showing welding equipment 50 including a welding apparatus 51. The welding equipment 50 is structured so as to include the welding apparatus 51, a multi-joint robot 52 for holding the welding apparatus 51, a controller 53 for controlling the welding apparatus 51 and multi-joint robot 52, a power supply apparatus 54 for supplying power to the welding apparatus 51 and multi-joint robot 52, and a holding apparatus 55 for holding an article 63 composed of a plurality of stacked members to be welded 61 and 62.

The multi-joint robot 52 is a conveying apparatus for moving the welding tool 20 to a predetermined part 64 of the article 63 and moves the welding apparatus 51 holding the welding tool 20 so as to take an optional position and an optional posture. The welding apparatus 51 is moved by the multi-joint robot 52 and welds the two members to be welded 61 and 62 held by the holding apparatus 55 each other.

The welding apparatus 51 has a predetermined reference axis. The welding tool 20 is held by the welding apparatus 51 so that the axis L1 thereof coincides with the reference axis. At this time, the axis L1 of the welding tool 20 is coaxial with the reference axis of the welding apparatus 51. Hereinafter, the reference axis of the welding apparatus 51 will be indicated by the same reference numeral L1 as that of the axis of the welding tool 20.

Figure 12:
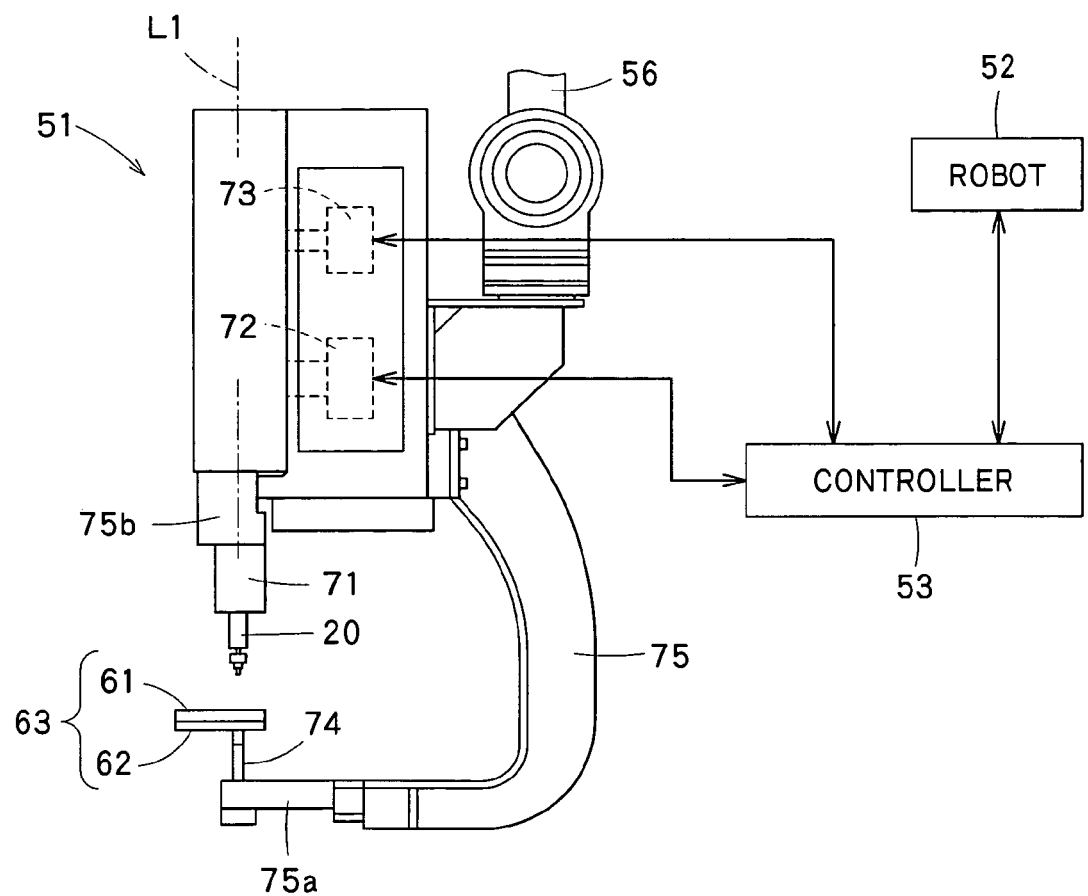
FIG. 12 is a block diagram showing the constitution of the welding apparatus 51.

FIG. 12 is a block diagram showing the constitution of the welding apparatus 51. The welding apparatus 51 is structured so as to include a tool holding section 71, a rotation driving means 72, a straight movement driving means 73, a support 74, and a base 75. The tool holding section 71 removably holds the welding tool 20. The tool holding section 71 is supported by the base 75 so as to rotate about the reference axis L1 and move linearly along the reference axis L1.

The rotation driving means 72 drives the tool holding section 71 so as to rotate about the reference axis L1. The straight movement driving means 73 drives the tool holding section 72 to move straight in the axial direction X. Concretely, the driving means 72 and 73 are respectively realized by including servo motors. The respective servo motors transfer power to the tool holding section 71 via a power transfer mechanism. By doing this, the tool holding section 71 rotates and moves straight.

The respective servo motors are feedback-controlled on the basis of the given current so as to rotate at predetermined torque and rotation amount. The driving means 72 and 73 are respectively equipped with given current detecting means for detecting the given current given to the respective servo motors. Further, the driving means 72 and 73 are respectively equipped with encoders for detecting the rotation amount of each of the servo motors.

The encoder corresponding to the rotation driving means 72 is a rotational speed detecting means for detecting the rotational speed of the welding tool 20. Further, the given current detecting means corresponding to the rotation driving means 72 is a load torque detecting means for detecting the torque of the welding tool 20 in the rotational direction. The encoder corresponding to the straight movement driving means 73 is a device position detecting means for detecting the position of the welding tool 20 in the axial direction X. Further, the given current detecting means corresponding to the straight movement driving means 73 is a pressure detecting means for detecting force for pressurizing the article 63 by the welding tool 20.

The support 74 is installed in an opposite position to the tool holder section 71 in the axial direction X. The support 74 is fixed to the base 75. The support 74 supports the article 63 from the opposite side of the welding tool 20 during friction-stir welding. The base 75 is connected to the front end of a robot arm 56 of the multi-joint robot 52 and supports directly or indirectly the tool holding section 71, driving means 72 and 73, and support 74.

The base 75 is driven to move to an optional position and posture by the robot arm 56. Further, the base 75 is the so-called C gun, which is formed almost in a C shape. The support 74 is installed at one end 75a of the base 75 in the circumferential direction. Further, the tool holding section 71 is installed at the other end 75b of the base 75 in the circumferential direction.

The controller 53 controls the robot arm driving means for driving each robot arm and controls the rotation driving means 72 and the straight movement driving means 73 of the welding apparatus 51. The controller 53 is given signals indicating detection results from the device position detecting means, the pressure detecting means, the rotational speed detecting means, and the load torque detecting means. The controller 53, on the basis of the signals given from the respective detecting means, controls the straight movement driving means 73 and the rotation driving means 72. The controller 53 controls the driving means 72 and 73, thereby can immerse the welding tool 20 into the article 63 at the target rotational speed and pressure.

Further, the controller 53 includes a processing circuit realized by a CPU (central processing unit) and a storage circuit realized by a RAM (random access memory) and a ROM (read only memory). The storage circuit stores an operation program relating to the operation conditions of the welding apparatus 51. For example, the operation conditions are the number of rotations of the welding tool 20, the immersion amount into the part to be welded, the immersion time, and the pressure and the optimum values thereof are stored beforehand. Further, the storage circuit stores movement information indicating the position of the part to be welded and the movement route of the base 75. The processing circuit of the controller 53 reads the operation program from the storage circuit and executes the operation program. By doing this, the controller 53, according to the operation program, can control the driving means 72 and 73 and the arm driving means.

Figure 13:
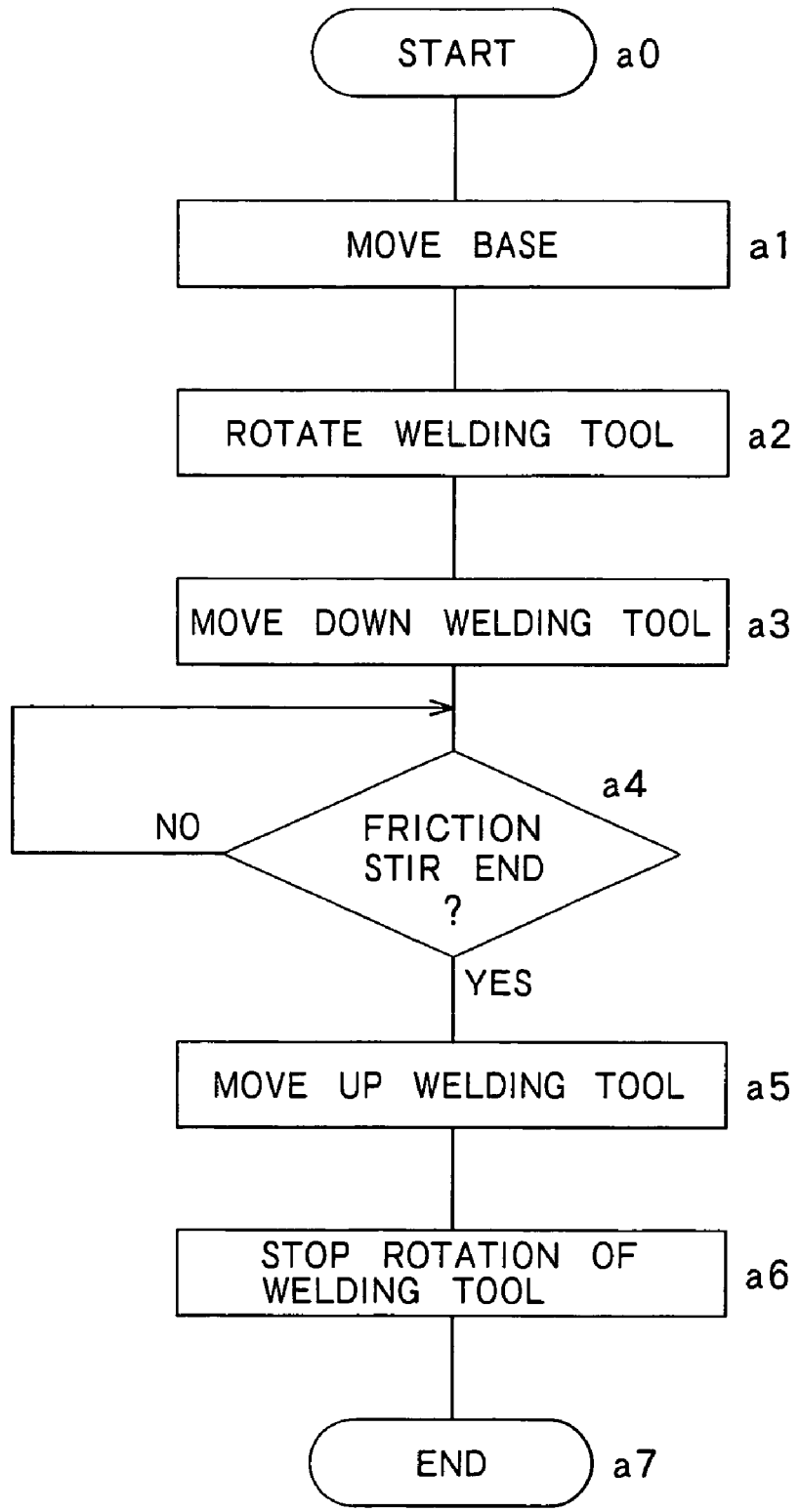
FIG. 13 is a flow chart showing a friction-stir welding procedure by a controller 53.

FIG. 13 is a flow chart showing the friction-stir welding procedure by the controller 53. Further, FIG. 14 includes sectional views for explaining the welding operation, and the operation is performed in the order of FIG. 14(1) to FIG. 14(4). Hereinafter, the operation of the controller 53 for executing spot-welding for one part to be welded will be explained.

The controller 53, at Step a0, when the movement information indicating the position of the part to be welded is taught, and the welding tool 20 is held by the tool holding section 71, and the welding preparation is completed, and a welding start command is given by, e.g., an operator, goes to Step a1 and starts the welding operation.

At Step a1, the controller 53 gives an operation instruction to the robot arm driving means and moves the base 75 to the teaching position neighboring to the part 64 set in the article 63. When the base 75 is arranged in the teaching position, the welding tool 20 is arranged away from the part 64 in the axial direction X. Further, when the base 75 is arranged in the teaching position, the support 74 makes contact with the article 63 from the opposite side to the welding tool 20. When the welding tool 20 is moved to the welding standby position like this, the controller 53 goes to Step a2.

At Step a2, the controller 53 controls the rotation driving means 72 and rotates the tool holding section 71. By doing this, as shown in FIG. 14(1), the welding tool 20 rotates together with the tool holding section 71, and when the rotational speed reaches a predetermined value, the controller goes to Step a3.

At Step a3, the controller 53 controls the straight movement driving means 73 and moves the tool holding section 71 in one axial direction X1. By doing this, the welding tool 20 approaches the article 63 while rotating about the axis L1. When the welding tool 20 starts straight movement, the controller 53 goes to Step a4.

Figure 14:
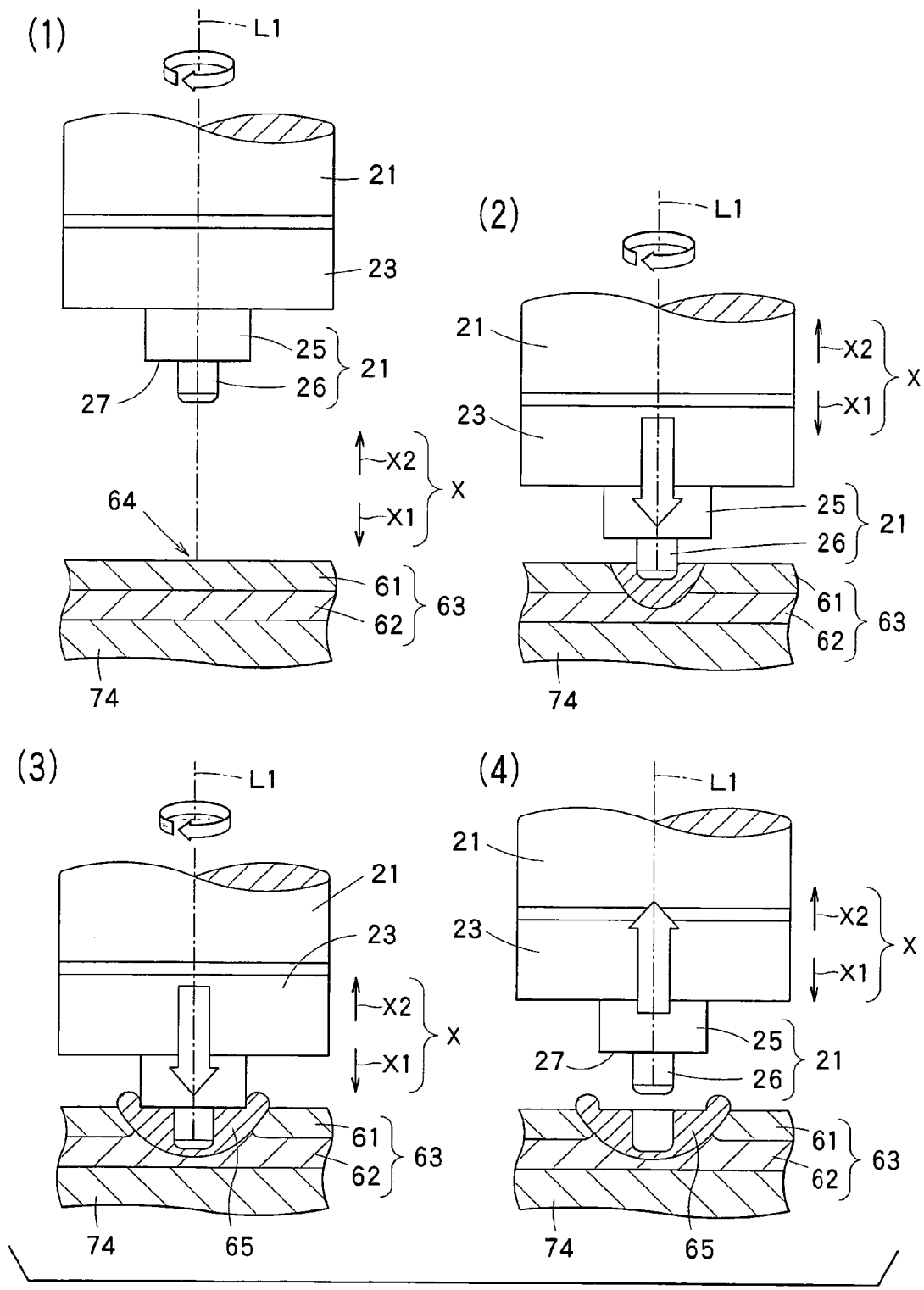
FIG. 14 includes sectional views for explaining the welding operation.

At Step a4, as shown in FIG. 14(2), the welding tool 20 is immersed into the part 64 with rotating. The welding tool 20, after immersed into the part to be welded, further moves in one axial direction X1 with rotating. The welding tool 20 continues rotation, so that the members to be welded 61 and 62, which are softened by frictional heat between the shoulder surface 27 and pin section 26 and the part to be welded 64, are dragged by the welding tool 20 and are plastically fluidized and stirred. By doing this, as shown in FIG. 14(3), around the pin section 26, an area 65 where the members to be welded 61 and 62 are mixed is formed and they are united with each other. At Step a4, the controller 53 judges whether a predetermined end condition is satisfied or not, and when the predetermined condition is satisfied, goes to Step a5.

The predetermined end condition, for example, is set depending on whether a predetermined welding time elapses from start of the welding operation of the welding tool 20 or not. In this case, the controller 53, when the welding time during which the welding tool 20 is expected to sufficiently stir the members to be welded 61 and 62 elapses after start of the welding operation, goes to Step a5. Here, the welding conditions such as the rotational speed, pressure and welding time, and the device shapes of the welding unit 22 and the tool holder 21 are preset or designed so that even if the members to be welded 61 and 62 are stirred sufficiently, the tool holder 21 and the fixing member 23 of the welding tool 20 are prevented from touching the welded article 63.

At Step a5, the controller 53 controls the straight movement driving means 73 to move the tool holding section 71 on the other axial direction X2. By doing this, as shown in FIG. 14(4), the welding tool 20 moves in the direction of separating from the welded article 63. And, when the welding tool 20 moves to the welding standby position, the controller 53 goes to Step a6. At Step a6, the controller 53 controls the rotation driving means 72 to stop the rotation of the welding tool 20. When the rotation of the welding tool 20 is stopped, the controller 53 goes to Step a7 to finish the welding operation. In this way, the spot welding operation is performed for one part 64. When performing the spot welding operation sequentially for a plurality of parts to be welded 64 under the same welding condition, the controller 53 repeats Steps a1 to a7 aforementioned.

As mentioned above, the welding apparatus 51 of this embodiment spot-welds two stacked members to be welded 61 and 62 using the welding tool 20 shown in FIG. 1. The welding unit 22 is immersed into the part to be welded 64, so that the welding unit 22 is more easily worn away than the tool holder 21. In this embodiment, the welding unit 22 is removably mounted on the tool holder 21, so that when the welding unit 22 is worn away, the worn welding unit 22 is removed, and a new welding unit 22 is attached to the tool holder 21. Thus the welding work can be continued without exchanging the tool holder 21 from the welding apparatus 51.

For example, when using a hard member to be welded having high strength at high temperature such as a steel member as a member to be welded, it is necessary to fix strongly the tool holder 21 and welding apparatus 51, so that it is difficult to cancel the mounting of the tool holder 21 and the welding apparatus 51. According to this embodiment, the welding unit 22 can be exchanged without removing the tool holder 21, so that even if the welding unit 22 is damaged, the welding operation can be restarted in a short time. Further, there is no need to exchange the whole welding tool 20, and the tool holder 21 can be reused, thereby the cost spent for welding can be decreased. For example, only the welding unit 22 can be exchanged, thus compared with the conventional welding tool, the manufacturing cost may be suppressed to 1/10 or less.

Further, the welding unit 22 is formed by a wear resistant material, thus even when welding a hard members such as a steel member, the number of times of welding until the welding unit 22 is worn away can be increased. Therefore, the number of times of exchanging the welding unit 22 can be reduced and the time required for the welding unit 22 to be exchanged can be shortened. Further, only the welding unit 22 is realized by a wear resistant material, so that compared with a case that the whole welding tool 20 is realized by a wear resistant material, the welding tool 20 can be realized at lower cost.

Further, for example, the welding unit 22 is realized from a material composed of a main component of silicon nitride, so that the welding unit 22 can obtain high strength and wear resistance and also resistance to thermal shock. When repeating spot welding, the condition that the welding unit 22 becomes warm at time of welding and when moving to the next welded part 64 becomes cool is repeated and the temperature change of the welding unit 22 is large. As mentioned above, the welding unit 22 of this embodiment has a resistance to thermal shock, so that it can withstand sudden temperature change, and even if spot-welding of a plurality of parts to be welded 64 is repeated, the welding tool can maintain strength necessary for the welding unit 22.

Further, at time of friction-stir welding, the pin section 26 is sufficiently immersed into the part 64, so that the flow area of the part 64 can be made larger. Further, the shoulder section 27 slides on the surface of the part 64, so that the fluid substance fluidized among the part 64 rotates greatly about the axis L1, thus the stirring efficiency can be improved. The shoulder section 25 and the pin section 26 are formed on the welding unit 22 like this, so that the respective members to be welded 61 and 62 can extend the mixed area to a wide range and the welding strength can be improved.

Further, in this embodiment, the welding unit 22 is fixed to the tool holder 21 by the fixing member 23, so that the welding unit 22 does not need to have a fixing structure for being fixed to the tool holder 21 and the welding unit 22 can be simplified. Therefore, the yield rate of the welding unit 22 is improved, thus the welding unit 22 can be formed at low cost and can be formed easily by a wear resistant material.

Further, in this embodiment, when the mounting section 24 is loosely fitted into the fitting concavity 31, the welding unit 22 is prevented from angular displacement about the axis from the tool holder 21. Further, since both ends of the mounting section 24 in the axial direction are clamped by the fixing member 23 and the tool holder 21, the welding unit 22 is fixed to the tool holder 21 in the axial direction X. The mounting section 24 is loosely fitted into the fitting concavity 31, so that there is no need to increase the dimensional accuracy required for the mounting section 24 and the fitting section 32, and the yield rate is increased, and the manufacturing cost can be decreased. Further, a gap is formed between the mounting section 24 inserted into the fitting concavity 31 and the fitting section 32, so that the welding unit 22 can be mounted or demounted easily from the tool holder 21. Further, by repeating spot welding, the temperature of the welding tool 20 may be changed frequently. Even if the components 21, 22, and 23 of the welding tool 20 are different in the thermal expansion rate, since the gap is formed between the mounting section 24 and the fitting section 32, the components 21, 22, and 23 of the welding tool 20 can be prevented from damage.

Further, when the welding unit 22 is fixed to the tool holder 21, the end wall section 34 of the fixing member 23 makes contact with the end face 38 of the mounting section 24 on one side of the axial direction and the end face of the fitting section 32 in the axial direction makes contact with the end face of the mounting section 24 on the other side of the axial direction. By doing this, in the fixed state, the welding unit 22 is prevented from shifting from the tool holder 21 in the axial direction X. Further, even if the part of the mounting section 24 which makes contact with the fixing member 23 is made smaller, the welding unit 22 can be prevented surely from moving in the axial direction X. Further, even if the dimension of the mounting section 24 in the axial direction X is made smaller, the welding unit 22 can be prevented surely from moving in the axial direction X. Therefore, the welding unit 22 can be miniaturized.

In the conventional art, the outer periphery surface of the shoulder section and the outer peripheral surface of the axial section are covered with a collar member, so that the shoulder section and the axial section are fixed. Therefore, it is necessary to precisely form the outer peripheral surfaces of the shoulder section and the axial section and the manufacturing cost is increased. Further, depending on a difference in the temperature expansion rate between the shoulder section, the axial section, and the collar member, there is the possibility that the shoulder section may come out from the axial section, so that the materials selectable as a shoulder section, an axial section, and a collar member are restricted. Further, to fix surely the shoulder section and the collar member, it is necessary to make the contact surface between the axial section and the collar member larger, thus the dimension of the axial section in the axial direction is increased.

On the other hand, in the welding tool 20 of this embodiment, the tolerable dimensional errors of the constituent members 21, 22, and 23 are large, thus the manufacturing cost can be reduced. Further, even if the welding unit 22 is miniaturized, the welding unit 22 can be fixed surely to the tool holder 21. Since the welding unit 22 can be miniaturized, the manufacturing cost can be reduced more.

Further, in this embodiment, on the welding unit 22 excluding the corners 40, the fitting section 32 and the mounting section 24 are in contact with each other. Therefore, the reactive force given from the article 63 during friction-stir welding is dispersed and transferred to the tool holder 21. By doing this, the tool holder 21 and the welding unit 22 are prevented from being given local large force and the tool holder 21 and the welding unit 22 can be prevented from damage. In this embodiment, to allow the fitting section 32 and the mounting section 24 to make contact with each other on the welding unit 22 excluding the corners 40 which is mounted on the tool holder 21, relief holes are formed in the fitting section 32. Further, as another embodiment, cutting off all of or a part of the corners 40 of the mounting section 24, R chamfering or C chamfering may be executed. By doing this, when the welding unit 22 is mounted on the tool holder 21, the fitting section 32 and the mounting section 24 can make contact with each other on the welding unit 22 excluding the corners 40. Further, when the mounting section 24 is loosely fitted into the fitting concavity 31, the mounting section 24 is formed so as to slightly move perpendicularly to the axis L1 of the tool holder 21. In this case, even if the mounting section 24 is moved most away from the tool holder 21 perpendicularly to the axis L1 thereof, it is preferable to form the pin section 26 so as to pass the axis L1 of the tool holder 21. By doing this, even if the welding unit 22 is fixed in the state that it is shifted from the axis L1 of the tool holder 21, the pin section 26 is prevented from separating from the axis L1 of the tool holder 21 and rotating around the axis L1 of the tool holder 21, thus defective welding can be prevented.

Further, depending on the welding condition, a plurality of welding units 22 different in shape can be prepared. Therefore, depending on the welding condition, the welding unit 22 can be exchanged easily without removing the tool holder 21 from the friction-stir welding apparatus. Further, there is no need to prepare welding tools 20 of the number according to the welding condition, and the welding units 22 of the number according to the welding condition are enough to be prepared. Therefore, even when executing spot welding under various welding conditions, the initial cost can be decreased.

FIG. 15 is a perspective view showing a welding unit 122 of the welding tool of the second embodiment of the present invention. The welding unit 122 has the shoulder section 25 and the pin section 26 similarly to the welding unit 22 of the welding tool 20 of the first embodiment. On the other hand, the shape of a mounting section 124 is different. Therefore, for the shoulder section 25 and the pin section 26, the explanation is omitted and the same reference numerals are assigned. The mounting section 124 is formed in a plate shape and the section perpendicular to the axis L1 is formed in an almost oval shape. Further, the tool holder of the second embodiment is different in the shape of the fitting concavity from that of the first embodiment. The fitting concavity is loosely fitted into the mounting section 124 and is formed in a space with a section of an oval shape. Therefore, when the mounting section 124 is fitted into the fitting concavity 32, it can be prevented from angular displacement about the axis L1. Further, the fixing member 23 makes contact with the end face of the mounting section 124 on one side of the axial direction and both end faces of the mounting section 124 in the axial direction are clamped by the fixing member 23 and the tool holder 31, thus the welding unit 122 can be prevented from movement in the axial direction X. Therefore, the same effect as that of the welding tool 20 of the first embodiment shown in FIG. 1 can be obtained. The mounting section 124 has a sectional shape larger than that of the shoulder section 25. If the pressure of the welding unit 122 to the tool holder 21 by the fixing member 23 is large sufficiently, the sectional shape thereof may be formed in circular. Since the pressure is large sufficiently, the welding unit 122 can withstand the rotational reactive force produced when it makes contact with the article to be welded 63 and is prevented from sliding so that it can be rotated together with the tool holder 21.

Further, even if the pressure of the welding unit 122 to the tool holder 21 by the fixing member 23 is small, there is no problem by forming the section perpendicular to the axis of the mounting section 124 in a polygonal shape or an oval shape so that the distance from the axis L1 to the outer periphery is changed. Further, as described later, as shown in FIGS. 17 to 21, the fixing member 23 may be formed unevenly. By doing this, the welding unit 122 can withstand the rotational reactive force produced when it makes contact with the article 63 and is prevented from sliding so as to be rotated together with the tool holder 21.

FIG. 16 is a perspective view showing a welding unit 222 of the welding tool of the third embodiment of the present invention. In the welding unit 222, a plurality of shoulder sections 25 (25A and 25B) are connected in the axial direction of the mounting section 124. Concretely, in the welding unit 222, a first shoulder section 25A is projected from one side of the mounting section 124 in the axial direction and a second shoulder section 25B is projected from the other side thereof. Further, a first pin section 26A is projected from the end face of the first shoulder section 25A and a second pin section 26B is projected from the end face of the second shoulder section 25B. The shapes of the shoulder sections 25A and 25B and the pin sections 26A and 26B are the same as that of the welding unit 22 shown in FIG. 1, so that the explanation will be omitted.

The fitting concavity 32 of the tool holder of the third embodiment is formed in a shape that the mounting section 124 is loosely fitted. Further, the second shoulder section 25B and the second pin section 26B are formed so as to be stored in the fitting concavity 32 when the mounting section 124 is fitted into the fitting concavity 32 and the first shoulder section 25A and first pin section 26A are projected from the tool holder. Namely, the fitting concavity 32 is formed so as to include a fitting area for fitting the mounting section 124 and a storage area for storing one of the shoulder section 25 and the pin section 26.

The storage area is formed in a smaller sectional shape than that of the fitting area, so that when the welding unit 222 is fitted into the fitting concavity, the fitting section makes contact with the end face of the mounting section 124. In this state, both end faces of the mounting section 124 are clamped by the fixing member 23 and the tool holder. Therefore, the welding unit 222 is fixed to the tool holder 21. Therefore, the same effect as that of the first embodiment shown in FIG. 1 can be obtained.

And, when either of the first shoulder section 25A and the first pin section 26A is worn away, the welding unit 222 is turned upside down. Concretely, when the mounting section 124 is fitted into the fitting concavity 32 and the second shoulder section 25B and the second pin section 26B are projected from the tool holder 21, the first shoulder section 25A and the first pin section 26A are stored in the fitting concavity 32. Therefore, one welding unit 222 can play a role of the two welding units 122 shown in FIGS. 1 and 15 and the convenience can be improved.

Figure 18:
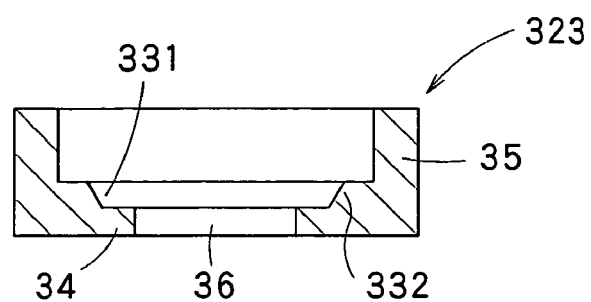
FIG. 18 is a sectional view viewed from the sectional line of XVIII-XVIII shown in FIG. 17.

FIG. 17 is an end face drawing showing a fixing member 323 of the welding tool of the fourth embodiment of the present invention and FIG. 18 is a sectional view viewed from the sectional line XVIII-XVIII shown in FIG. 17. In the fourth embodiment, the fixing member 323 different from the fixing member 22 shown in FIG. 1 is used. FIG. 17 shows a case that the welding unit 122 shown in FIG. 15 is used.

In the fixing member 323, a fitting concavity 331 where the mounting section 124 of the welding unit 122 is fitted is formed. In other words, means for preventing the angular displacement of the welding unit 122 is formed on the side of the fixing member 323. The fixing member 323 is the same as the fixing member 23 of the first embodiment except that a fitting concavity 332 is formed, so that the explanation about the same constitutions will be omitted and the same reference numerals as those of the fixing member 23 of the first embodiment are assigned. Further, in the fourth embodiment, in the tool holder, no fitting concavity is formed and the end face of the front end 30 is formed flat.

Concretely, on the end wall section 34 of the fixing member 323, on the side where the peripheral wall section 25 is installed, the fitting section 332 where the fitting concavity 331 is formed is formed. The end face of the mounting section 124 on one side of the axial direction makes contact with the fitting section 332 and the outer peripheral surface of the mounting section 124 makes contact with it. The mounting section 124 is loosely fit into the fitting concavity 331 and in the fit state, is prevented from the angular displacement with respect to the fixing member 323. The fixing member 323 is engaged with the tool holder in this state, thus the welding unit 122 is fixed to the tool holder. Therefore, the welding unit 122 can be fixed removably to the tool holder. Further, by forming on the tool holder a concavity where the shoulder section 25 and the pin section 26 are loosely fitted, so that the welding unit 222 shown in FIG. 16 can be fixed to the tool holder. As mentioned above, using the welding tool of the fourth embodiment, the same effect as that of the first embodiment can be obtained. Further, in the fourth embodiment, when the shape of the mounting section 124 is different, a fixing member according to the mounting section 124 can be prepared and there is no need to change the shape of the tool holder in accordance with the shape of the mounting section 124. Therefore, a plurality of welding units different in the shape of the mounting section 124 can be fixed to the tool holder.

Figure 19:
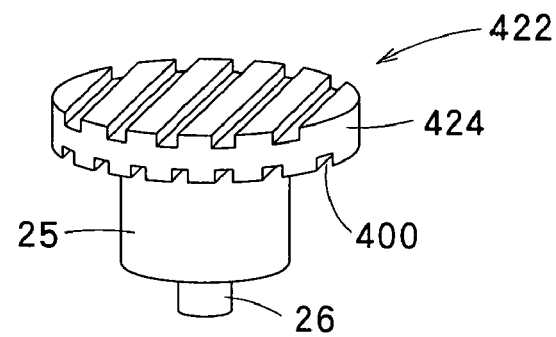
FIG. 19 is a perspective view showing a welding unit 422 of the welding tool of the fifth embodiment of the present invention.
Figure 20:
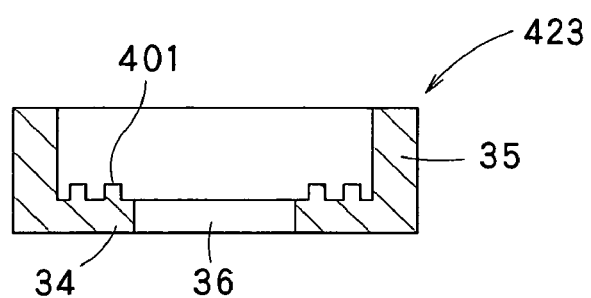
FIG. 20 is a sectional view showing a fixing member 423 of the fifth embodiment.

FIG. 19 is a perspective view showing a welding unit 422 of the welding tool of the fifth embodiment of the present invention. FIG. 20 is a sectional view showing a fixing member 423 of the fifth embodiment. The welding unit 422 has the shoulder section 25 and the pin section 26 similarly to the welding unit 22 of the welding tool 20 of the first embodiment. On the other hand, the shape of a mounting section 424 is different. Therefore, for the shoulder section 25 and the pin section 26, the explanation is omitted and the same reference numerals are assigned.

The mounting section 424 is formed in an almost circular shape and formed coaxially with the shoulder section 25. On the mounting section 424, at the end face section in contact with at least either of the fixing member and the tool holder, an uneven part 400 is formed. Here, the uneven part 400 may include any one of a rough surface shape, a spline shape, an ant slit shape, and a saw slit shape. The mounting section is clamped by the fixing member and the tool holder. The uneven part 400 is formed at the end face section, thus the welding unit 424 can be prevented from angular displacement with respect to the tool holder.

Similarly, in at least either of the fixing member and the tool holder, an uneven part 401 is formed at the end face section in contact with the mounting section 24. The uneven part 401 is fitted into the uneven part 400 formed in the mounting section 424, thus the welding unit 422 can be prevented surely from angular displacement with respect to the tool holder. The part for preventing angular displacement of the welding unit 422 like this may be formed on either of end faces of the mounting section 424. Further, the section of the mounting section 424 may be in any shape other than a circle.

Figure 21:
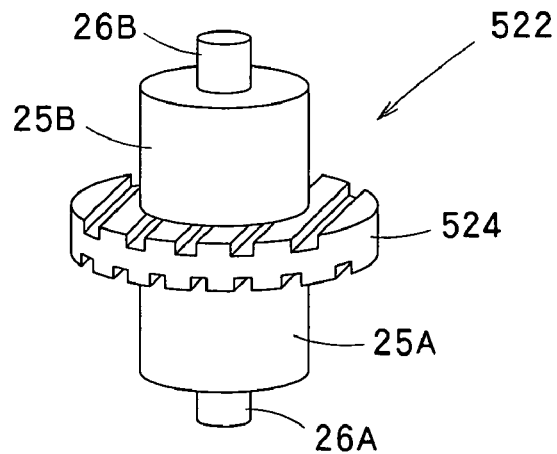
FIG. 21 is a perspective view showing a welding unit 522 which is a modification of the fifth embodiment.

FIG. 21 is a perspective view showing a welding unit 522 which is a modification of the fifth embodiment. Even in the fifth embodiment, as shown in FIG. 16, the shoulder sections 25A and 25B and the pin sections 26A and 26B may be formed respectively on both sides of the mounting section 424. Even if the welding tool of the fifth embodiment is used like this, the same effect as that of the first embodiment can be obtained. Further, the uneven parts 400 of the mounting sections 524 may be formed on either of the end face on one side of the axial direction and the end face on the other side of the axial direction and may be formed on both end faces.

Figure 22:
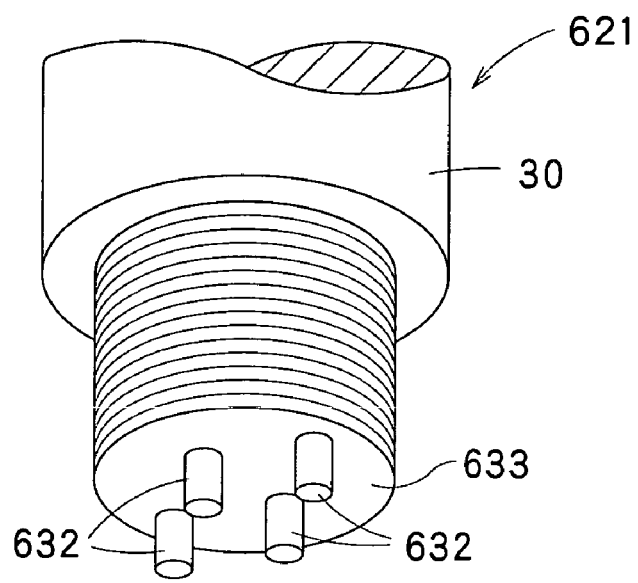
FIG. 22 is a perspective view showing a tool holder 621 of the welding tool of the sixth embodiment of the present invention.
Figure 23:
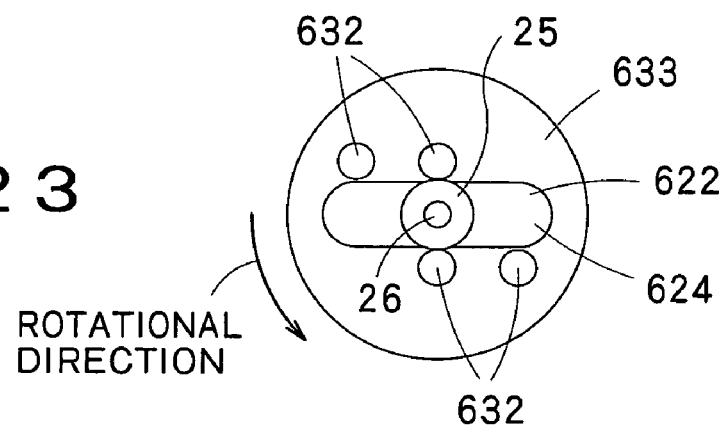
FIG. 23 is an end face diagram showing the state that a welding unit 622 is positioned coaxially with the axis L1 of the tool holder 621.

FIG. 22 is a perspective view showing a tool holder 621 of the welding tool of the sixth embodiment of the present invention. FIG. 23 is an end face diagram showing the state that a welding unit 622 is positioned coaxially with the axis L1 of the tool holder 621. At the front end section 30 of the tool holder 621 of the sixth embodiment, an external screw section 633 for mounting the fixing member 23 is formed, and from the end face of the external screw section 633, a plurality of projections 632 are projected. As mentioned above, on the tool holder 621 of the sixth embodiment, in place of the fitting section 32, the projections 632 for preventing the angular displacement of the welding unit 622 are formed.

The respective projections 632 are arranged at some intervals so that the welding unit 622 can be arranged coaxially with the axis L1 of the tool holder 621. When the welding unit 622 is positioned coaxially with the axis L1 of the tool holder 621 and the end face of the mounting section 624 of the welding unit 622 is in contact with the end face of the external screw section 633, the respective projections 632 prevents the welding unit 621 from angular displacement about the axis.

In FIG. 23, a mounting section 624 of the welding unit 622 is formed in a sectional shape of almost bar. The plurality of projections 632 are arranged around the peripheral wall of the mounting section 624 positioned coaxially with the tool holder 621. The respective projections 632 are installed on both side with respect to the axis of the tool holder 621. In this embodiment, the projections 632 are formed in a columnar shape. And, during friction-stir welding, the projections 632 and the mounting section 624 make line contact, thus the welding unit 622 is prevented from angular displacement with respect to the tool holder. Similarly to the first embodiment, both end faces of the mounting section 624 are clamped by the fixing member 23 and the tool holder 621 so as to be fixed with respect to the axial direction X of the welding unit 622.

As shown in the sixth embodiment, even if the outer periphery of the mounting section 624 and the projections 632 are in line contact, the same effect as that of the first embodiment can be obtained. The welding unit 622 and the tool holder 621 make line contact, thus the quantity of heat transferred from the welding unit 622 to the tool holder 621 can be reduced and when repeating spot welding, the welding unit 622 can be kept hot.

Figure 24:
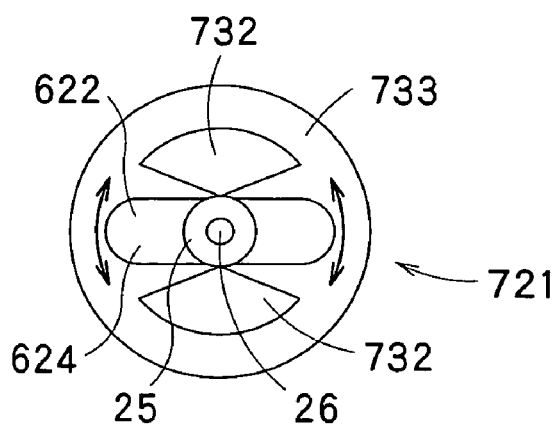
FIG. 24 is an end face diagram showing a tool holder of the welding tool of the seventh embodiment of the present invention.
Figure 25:
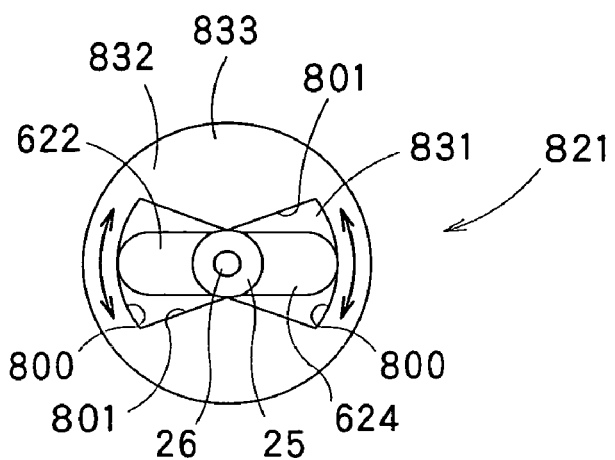
FIG. 25 is an end face diagram showing a tool holder of the welding tool of the seventh embodiment of the present invention.
Figure 26:
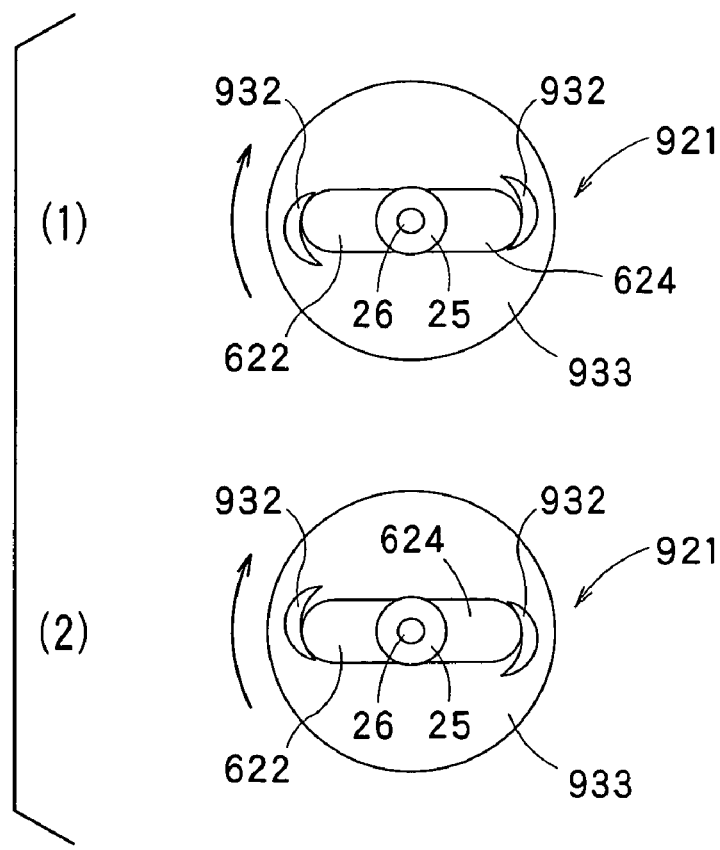
FIG. 26 includes end face diagrams showing a tool holder of the welding tool of the seventh embodiment of the present invention.

FIGS. 24 to 26 are end face drawings showing the tool holder of the welding tool of the seventh embodiment of the present invention. On the tool holder, the aforementioned projections or fitting section is formed on the external screw section.

The welding unit is formed so as to execute angular displacement within a predetermined range in the axial direction when it is positioned coaxially with the tool holder. Therefore, the welding unit can be mounted easily on the tool holder. Further, at time of welding, the welding unit is kept in the coaxial state with the tool holder and executes angular displacement within the predetermined range, thus the welding unit makes contact with the projections or the fitting section formed on the tool holder and is prevented from further angular displacement. Similarly to the first embodiment, both end faces of the mounting section 624 are clamped by the fixing member 23 and the tool holder so as to be fixed with respect to the axial direction X of the welding unit. Therefore, the effect of the angular displacement of the welding unit on the tool holder is eliminated and friction-stir welding can be executed.

In FIG. 24, on a tool holder 721, two fan-shaped projections 732 projected from an external screw section 733 are formed. The two projections 732 are opposite to each other with respect to the axis L1 of the tool holder and are arranged at an interval in which the welding unit 622 is inserted. To allow the mounting section 624 to execute angular displacement within the predetermined range, a space is set between the projections 732.

In this embodiment, the mounting section 624 having a bar-like sectional shape is arranged coaxially with the axis L1 of the tool holder 721 between the two projections 732. In this state, when the mounting section 624 executes angular displacement about the axis L1 in one direction, the outer peripheral surface of the mounting section 624 makes contact with the peripheral surfaces of the two projections 732 so as to be prevented from further angular displacement.

In FIG. 25, a tool holder 821 is provided with a fitting section 832 where a fitting concavity 831 is formed so as to concave into an external screw section 833. On the fitting section 832, two almost fan-shaped spaces are opposite to each other with respect to the axis L1 of the tool holder 821. The fitting section 832 has a first peripheral surface 800 extending along the arc centering on the axis L1 and a second peripheral surface 801 extending from the periphery of the first peripheral surface 800 toward the axis L1.

In this embodiment, when the mounting section 624 is fitted into the fitting concavity 831, the welding unit 622 is arranged coaxially with the tool holder 821. In this state, when the mounting section 624 executes angular displacement about the axis L1 in one direction, the outer peripheral surface of the mounting section 624 makes contact with the second peripheral surface 801 so as to be prevented from further angular displacement.

In FIG. 26, a tool holder 921 is provided with two crescent-shaped projections 932 projected from an external screw section 933. FIG. 26(1) shows the state that the mounting section 624 can execute angular displacement about the axis L1 and FIG. 26(2) shows the state that the mounting section 624 is prevented from angular displacement in one direction about the axis L1.

The two projections 932 are opposite to each other with respect to the axis L1 of the tool holder 921 and are arranged at an interval in which the welding unit 622 is inserted. The space between the projections 932 is formed so that the mounting section 624 can execute angular displacement at a predetermined angle. In the respective projections 932, the curved surface facing the axis L1 is formed so that the distance between the axis L1 and the curved surface is getting shorter along one peripheral direction about the axis L1.

In this embodiment, the mounting section 624 is arranged coaxially with the axis L1 of the tool holder 921 between the two projections 932. In this state, when the mounting section 624 executes angular displacement about the axis L1 in one peripheral direction, the outer peripheral surface of the mounting section 624 makes contact with the peripheral surfaces of the two projections 932 so as to be prevented from further angular displacement. By such a welding tool of the seventh embodiment shown in FIGS. 24 to 26, the same effect as that of the first embodiment can be obtained.

The embodiments of the present invention as mentioned above are just examples of the present invention and the constitutions thereof can be modified within the scope of the present invention. For example, although the welding tools of these embodiments can be preferably used for spot welding of hard members to be welded, it can also be used, for example, for aluminum members to be welded other than hard members. Further, they may be used for other than spot welding.

Further, the shapes of the fitting section 32 and the mounting section 24 are just examples of the present invention and the structure that the welding unit 22 can be mounted on the tool holder 21 or the fixing member 23 may be formed in either of the tool holder 21 and the fixing member 23 and the welding unit 22. For example, it is possible to form a fitting concavity in the welding unit 22 so as to form a fitting section for fitting the tool holder 21 or the fixing member 23 into the fitting concavity. Further, in this embodiment, although the constitution that the welding unit 22 is fixed to the tool holder 21 using the fixing member 23 is explained, the welding unit 22 may be directly fixed to the tool holder 21 without using the fixing member 23. For example, threads may be formed on the welding unit 22. Further, the constitution of the welding apparatus 51 can be changed properly and the welding apparatus may not be conveyed by the multi-joint robot. Further, a constitution that the tool holder 21 is fixed to the welding apparatus 51 may be used. Further, although the welding unit 22 is made of silicon nitride, any material having high hardness other than silicon nitride may be appropriate. For example, a device material including at least any of a nitride, an oxide, and a carbide may be used.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A welding tool used in a friction-stir welding apparatus for welding a plurality of members to be welded, comprising:
   a tool holder having a front end and a base end, said base end being held by said friction-stir welding apparatus so as to be driven to rotate and move by said friction-stir welding apparatus;
   a welding unit of a wear resistant material including a mounting section that is removably inserted in said front end of said tool holder, said welding unit removably inserted in said front end of said tool holder being immersed into a part of said members to be welded during a friction-stir welding; and
   a fixing member adapted to be mounted on said tool holder for removably fixing said welding unit to said tool holder, said fixing member abutting said mounting section of said welding unit on a surface of said mounting section that is substantially parallel to a surface of a member to be welded.

2. A welding tool according to claim 1, wherein:
   said welding unit further includes:
   a shoulder section connected to said mounting section and having an end face, said shoulder section being formed in a columnar shape coaxial with a rotation axis of said tool holder when said mounting section is inserted in said tool holder; and
   a pin section projected in an axial direction along said rotation axis from said end face of said shoulder section, said pin section being formed coaxially with said rotation axis of said tool holder when said mounting section is inserted in said tool holder, said pin section being formed in a columnar shape or a conical shape with a diameter smaller than a diameter of said shoulder section.

3. A welding tool according to claim 2, wherein:
   said tool holder has a fitting concavity at the front end of said tool holder, said mounting section being loosely fitted into said fitting concavity of said tool holder,
   said mounting section is formed so as to project beyond said shoulder section in a radial direction, said mounting section being prevented from an angular displacement about said rotation axis of said tool holder with respect to said tool holder when said mounting section is fitted into said fitting concavity of said tool holder, and
   said fixing member is adapted to be mounted on said tool holder so as to clamp said mounting section in said axial direction in cooperation with said tool holder so that said welding unit is prevented from coming out from said fitting concavity in said axial direction.

4. A welding tool according to claim 3, wherein:
   said mounting section has a section perpendicular to said rotation axis, said section including corners,
   at least either said fitting concavity or said mounting section is configured so that only a remaining part excluding said corners of said mounting section makes contact with said tool holder when said mounting section is fitted into said fitting concavity.

5. A welding tool according to claim 1, wherein said welding unit is made of a material composed of a main component of silicon nitride.

6. A welding tool according to claim 1, wherein said welding tool is used for spot welding said members to be welded.

7. A welding unit used for a welding tool,
   wherein said welding unit is made of a wear resistant material and inserted in said front end of said tool holder, said welding unit inserted in said front end of said tool holder being immersed into a part of said members to be welded during a friction-stir welding,
   wherein a fixing member adapted to be mounted on said tool holder for removably fixing said welding unit to said tool holder, said fixing member abutting said mounting section of said welding unit on a surface of said mounting section that is substantially parallel to a surface of a member to be welded.

8. A friction-stir welding apparatus for welding a plurality of members to be welded, comprising:
   said welding tool as defined in claim 1;
   a tool holding section adapted to hold said welding tool;
   rotation driving means for driving said tool holding section to rotate about said rotation axis;
   straight movement driving means for driving said tool holding section to move along said rotation axis.

9. A welding tool according to claim 1, wherein said fixing member has screw means for mounting said fixing member on said tool holder.

10. A welding tool according to claim 1, wherein said fixing member has a top surface having an aperture therethrough, through which passes a portion of said welding unit when said fixing member is in an attached state.

* * * * *